United States Patent [19]

Morrow et al.

[11] 3,756,262
[45] Sept. 4, 1973

[54] POWER TRANSMISSION
[75] Inventors: William J. Morrow, Troy; James M. Davenport, Sterling Heights, both of Mich.
[73] Assignee: Sperry Rand Corporation, Troy, Mich.
[22] Filed: Apr. 9, 1971
[21] Appl. No.: 132,855

[52] U.S. Cl. ............................ 137/38, 137/625.61
[51] Int. Cl. ............................................. G05d 1/08
[58] Field of Search ................ 137/38, 85, 625.61, 137/82; 91/419; 244/78, 79

[56] References Cited
UNITED STATES PATENTS

| | | | |
|---|---|---|---|
| 3,095,002 | 6/1963 | Healy | 137/85 |
| 2,933,269 | 4/1960 | Hanna et al. | 244/79 |
| 3,265,335 | 8/1966 | McPherson | 244/79 |
| 3,054,416 | 9/1962 | Lucien | 137/82 |
| 3,389,719 | 6/1968 | Van Ausdal et al. | 137/625.61 |

FOREIGN PATENTS OR APPLICATIONS

| 929,515 | 7/1947 | France | 244/79 |
|---|---|---|---|

Primary Examiner—Robert G. Nilson
Attorney—Van Meter and George

[57] ABSTRACT

A rate gyroscope generates pressure signals in a hydraulic circuit proportional to the rate of turn of the support on which the gyroscope is mounted; for example, a ship having roll stabilization fins. The gyroscope cage is connected to a flapper controlling the escape of fluid from a pair of nozzles, the connection being through a torsionally resilient member which gives a natural frequency of vibration of the flapper many times the highest oscillation rate of the ship or other base for the gyroscope. The gyroscope cage is unrestrained by centering springs or the like, and precession away from a neutral position is resisted solely by the jet reaction forces at the flapper valve. The device is entirely fluid operated, both for rotor spin and for precession read-out.

6 Claims, 4 Drawing Figures

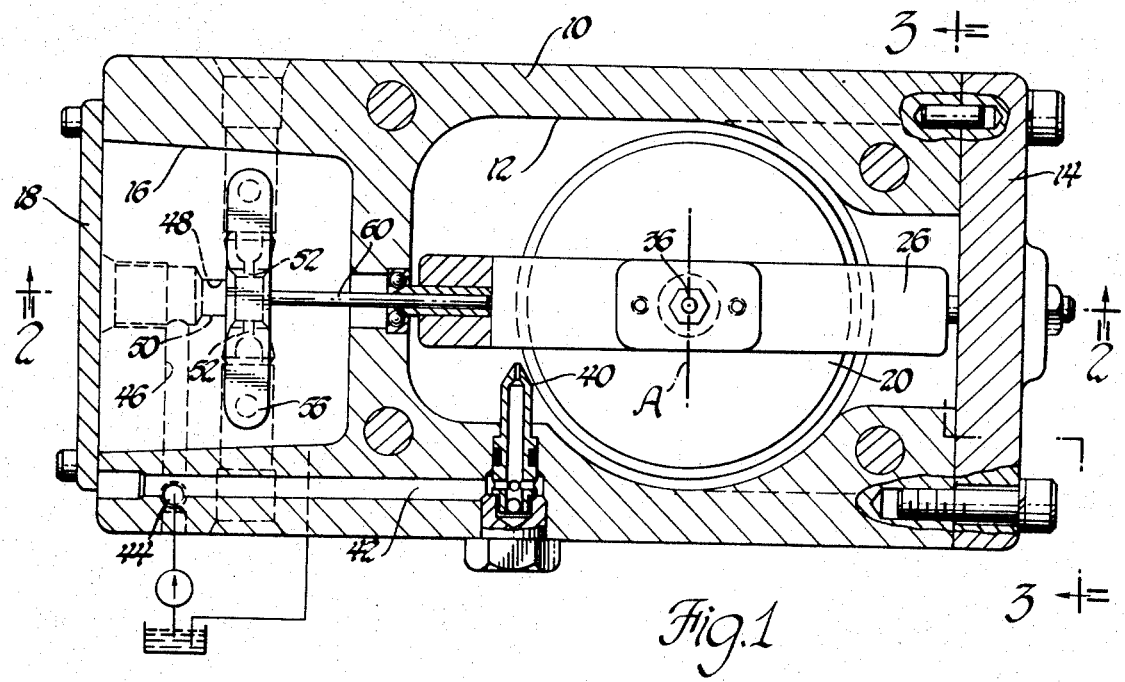

INVENTORS
William J. Morrow &
BY James M. Davenport

ATTORNEY

POWER TRANSMISSION

The invention aims to produce a superior rate gyroscope for generating pressure signals which may be used to control a remote servomotor for actuating ship stabilizing fins or the like, and which avoids the use of electric drives and signal generators. It is also an object of the invention to provide such a device which may be utilized in an all-hydraulic system.

These objects are achieved by the provision of a gyroscopic pressure controller for generating pressure values in a fluid circuit, the magnitude and sign of which indicate the rate and direction of turn of the object on which the controller is mounted and which comprises a main supporting frame, a gyroscope cage journalled in the frame for free and unrestrained motion through a limited angle about a precession axis, a rotor journalled in the cage for rotation about a spin axis perpendicular the precession axis, a rotor drive nozzle aimed at the periphery of the rotor, means on the frame supporting a pair of valving nozzles, a flapper controlling the nozzles to variably and oppositely restrict the escape of fluid from them, means for directing fluid to and from the three nozzles including pressure dropping restrictors ahead of each valving nozzle, and a torsionally resilient connection between the gyroscope cage and the flapper having a force-displacement rate selected to give the flapper a natural vibration frequency many times higher than the highest frequency of turning oscillation of the object on which the controller is mounted.

IN THE DRAWINGS

FIG. 1 is a top view, partly in section, of a gyroscopic pressure controller incorporating a preferred form of the present invention.

FIG. 2 is a cross sectional view on line 2—2 of FIG. 1.

Figure 3:
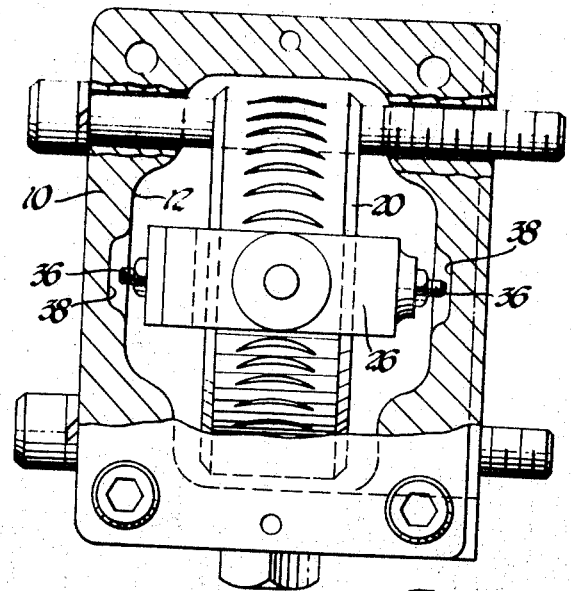
FIG. 3 is an end view, partly in section, on line 3—3 of FIG. 1.

Referring now to FIG. 1, there is shown a main base or frame 10 which may be formed as a block having a gyroscope cavity 12 closed by an end cap 14 and a valve cavity 16 closed by an end cap 18. The cavity 12 contains a rate gyroscope which consists of a rotor 20 journalled on bearings 22 mounted on a stationary shaft 24 which is carried in a cage 26. The cage 26 is pivoted on bearings 28 and 30 in the frame 10 and the cap 14 respectively. Bearing 30 is adjustable axially by means of a set screw 32 which may variably compress a wave washer 34. The rotor shaft 24 is positioned by means of set screws 36 which serve also as limit stops by engagement with grooves 38 in the side walls of the cavity 12. The periphery of the rotor 20 is serrated as indicated in FIG. 3, and a rotor driving nozzle 40 is mounted in the frame 10 and aimed at these serrations to strike them at a point intersecting the pivotal axis of the cage 26 about which the gyroscope may precess. Fluid such as hydraulic oil is supplied to the nozzle 40 through a passage 42 in the frame 10. This establishes a means for driving rotor 20 without the necessity of providing any fluid connection from the base to the pivoted cage.

A fluid inlet connection at 44 leads from the bottom of base 10 upwardly to intersect passage 42 and also intersects a branch 46, leading to an axial passage 48 and thence to a cross passage 50. In the cross passage 50 are a pair of pressure dropping restrictors 52 which supply fluid to a pair of valving nozzles 54. These open in a plane substantially coincident with the plane of the precession axis and are controlled by a flat flapper valve 56. The flapper 56 may be adjusted toward and away from the nozzles 54 by a set screw 58 having a point engaging a groove in the top of the flapper 56.

The cage 26 and the flapper 56 are connected by a torsionally resilient rod 60, rigidly secured to each member. The force-displacement rate of the rod 60 is so chosen as to produce a natural vibration frequency of the flapper which is many times higher than the most rapid turning oscillation which the ship or other object to which the base 10 is secured will undergo in normal operation. The rod 60 is also sufficiently flexible to act as a beam and allow adjustment of the flapper valve 56 toward and away from the nozzles 54 by means of the set screw 58.

The device thus far described, when secured to a ship or other support which partakes of turning movement, is sensitive to such movements which occur about an axis, as indicated at A in FIGS. 1 and 2. Turning about axis A at any particular rate will produce a precession force on the cage 26 tending to turn the flapper valve 56. This force varies in magnitude and direction in accordance with the rate and direction of the turning motion of the base 10 about axis A. Only exceedingly small movements of the flapper valve 56 are required to generate substantial changes in the fluid pressure forces exerted by the nozzles 54 on the flapper. For example, a full stroke of the order of magnitude of one minute of arc can generate a pressure difference between the two nozzles equal to at least 50 percent of the mean pressure at balance. Thus, a substantially null read-out may be obtained.

Figure 4:
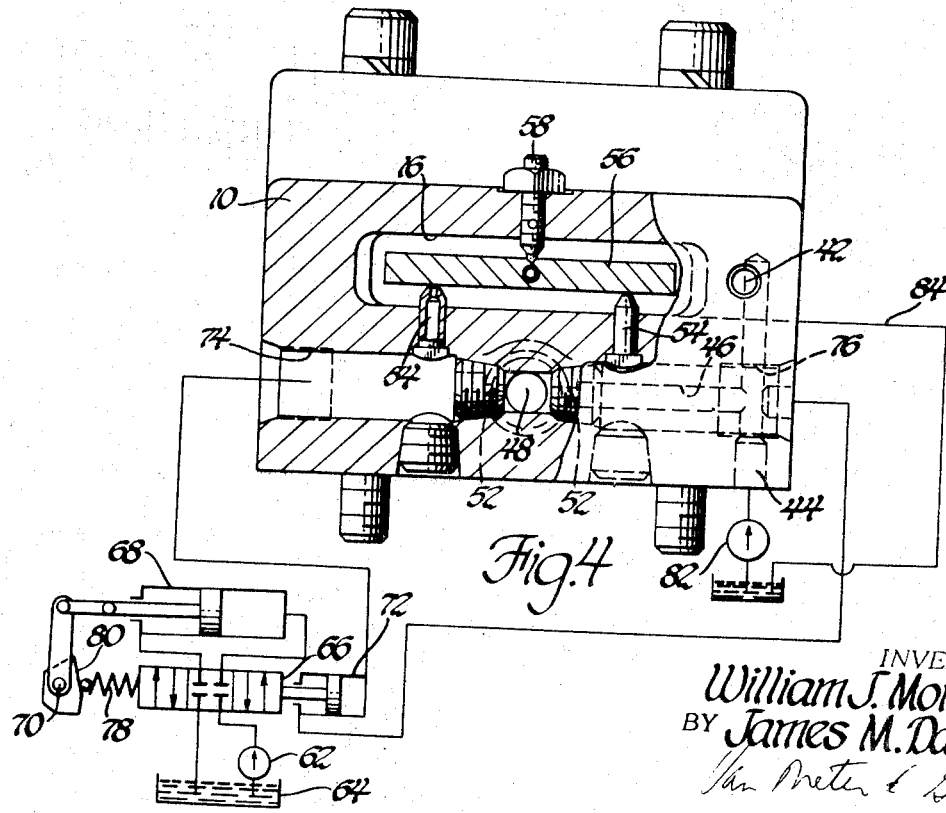
FIG. 4 is a fragmentary sectional view on line 4—4 of FIG. 2 and includes a circuit diagram.

As an example of the type of system in which the gyroscopic pressure controller may be utilized, there is diagrammed in FIG. 4 a system consisting of a pump 62, reservoir 64 and a directional valve 66 which control a servomotor 68 for positioning a shaft 70 which may be connected to a stabilizing fin. The valve 66 is positioned by a double-acting piston and cylinder 72 which is connected to the base 10 at control ports 74 and 76 through which the outlet pressures at the nozzles 54 are sensed. The position of the fin shaft 70 is transmitted to the valve 66 by a spring 78 and cam 80. Thus, at zero rate of roll of the ship, the flapper 56 maintains equal pressures at the nozzles 54. Due to the differential area at the piston and cylinder 72, the force of the spring 78 with the fin shaft 70 in central position, is balanced. Whenever the ship experiences a rolling motion, the rate of roll is transmitted as a pressure difference to the piston and cylinder 72, thus upsetting the balance with the spring 78, causing the valve 66 to move in the proper direction to drive the servomotor 68 and through cam 80, to change the force of spring 78 sufficiently to compensate for the pressure difference at the nozzles 54. While a separate fluid supply, as indicated at 82, for connection with the inlet 44 is preferred, the pump 62 may also be used as a pressure source eliminating the pump 82. Returned fluid from the cavities 12 and 16 may take place through a conduit 84.

We claim:

1. A gyroscopic pressure controller for generating pressure valves in a fluid circuit, the magnitude and sign of which indicate the rate and direction of turn of the object on which the controller is mounted, comprising a main supporting frame, a gyroscope cage journalled in the frame for free and unrestrained motion through a limited angle about a precession axis, a rotor journalled in the cage for rotation about a spin axis perpendicular to the precession axis, a rotor drive nozzle aimed at the periphery of the rotor, means on the frame supporting a pair of valving nozzles, a flapper controlling the nozzles to variably and oppositely restrict the escape of fluid from them, means for directing fluid to and from the three nozzles including pressure dropping restrictors ahead of each valving nozzle, and a torsionally resilient connection between the gyroscope cage and the flapper having a force-displacement rate selected to give the flapper a natural vibration frequency many times higher than the highest frequency of the turning oscillations of the object on which the controller is mounted.

2. A controller as defined in claim 1 wherein the torsionally resilient connection comprises a straight rod attached to the cage and extending along the precession axis.

3. A controller as defined in claim 2 wherein the rod forms a mounting for the flapper, the flapper extending equally on opposite sides of the rod substantially in a plane containing the precession axis, and the valving nozzles are positioned on opposite sides of the precession axis and facing the flapper.

4. A controller as defined in claim 3 including means abutting the flapper substantially at the precession axis and on the opposite side from the valving nozzles for resisting the combined pressure reaction of the fluid issuing from both nozzles.

5. A controller as defined in claim 4 wherein the last-named means is adjustable toward and away from the precession axis to vary the mean pressure in the valving nozzles.

6. A controller as defined in claim 5 wherein the torsionally resilient rod acts also as a bendable beam to allow the adjustment of the last-named means.

* * * * *